United States Patent Office 3,461,216
Patented Aug. 12, 1969

3,461,216
APPARATUS FOR TEMPERATURE MEASURE-
MENT IN VACUUM MELTING AND CAST-
ING INSTALLATIONS
Leonard S. Taylor, Sheffield, England, assignor to
G. L. Willan Limited
Filed Aug. 30, 1967, Ser. No. 664,370
Claims priority, application Great Britain, Sept. 3, 1966,
39,480/66
Int. Cl. F27d 7/06, 19/00
U.S. Cl. 13—31     3 Claims

ABSTRACT OF THE DISCLOSURE

Apparatus for taking the temperature of molten metal in a vacuum melting furnace comprises mounting a thermocouple at one end of the furnace, disposing the furnace during melting in an attitute in which the metal will not contact the thermocouple, and then when it is desired to take the temperature of the molten metal, tilting the furnace to bring the molten metal into contact with the thermocouple.

---

This invention relates to metal melting furnaces has for its object the provision apparatus for taking the temperature of molten metal in a vacuum melting furnace or other melting furnace where it is not possible to gain physical access for insertion of an immersion pyrometer or visual access for an optical pyrometer, or when it is undesirable to make provision for such access.

According to the present invention, apparatus for taking the temperature of molten metal in a vacuum or other melting furnace comprises mounting a thermocouple at one side of the furnace, disposing the furnace during melting in an attitude in which the metal will not contact the thermocouple, and then, when it is desired to take the temperature of the molten metal, tilting the furnace to bring the molten metal into contact with the thermocouple. The furnace may be maintained in the latter position until the casting or pouring temperature is reached, the invention enabling precise temperatures to be reached without the delay associated with other methods, as the thermocouple does not have to be withdrawn before pouring commences.

The furnace may be tilted in the opposite direction during charging and melting, it being recommended that during these stages the metal charge is not allowed to come into contact with the thermocouple lest it should be damaged or coated or otherwise prevented from functioning properly when the time comes to take the temperature and act accordingly.

Figure 1:
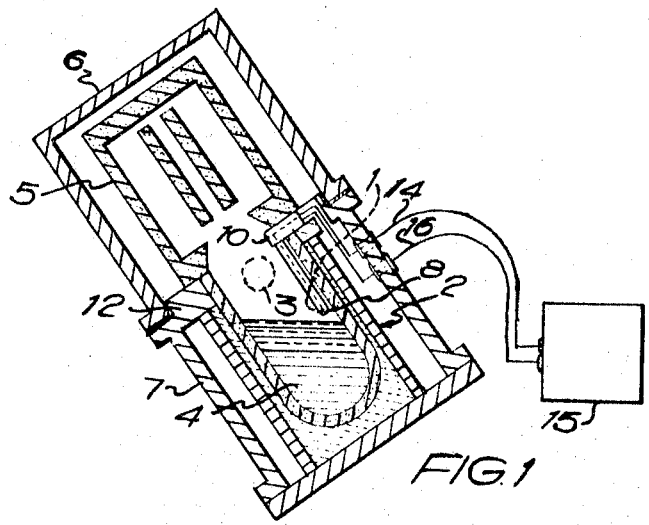
Figure 2:
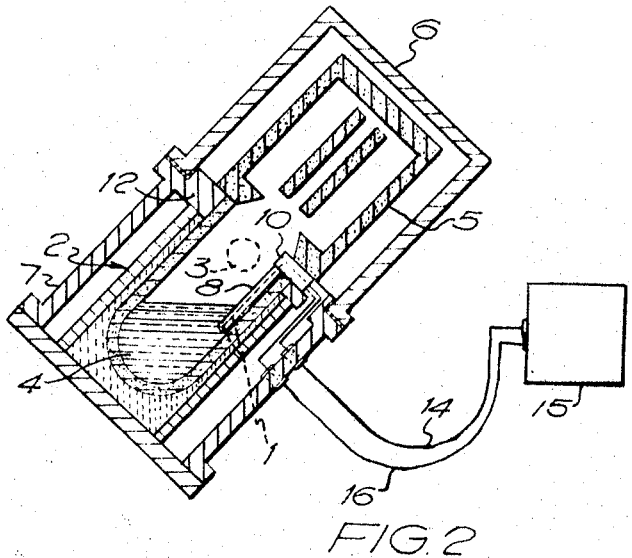
Figure 3:
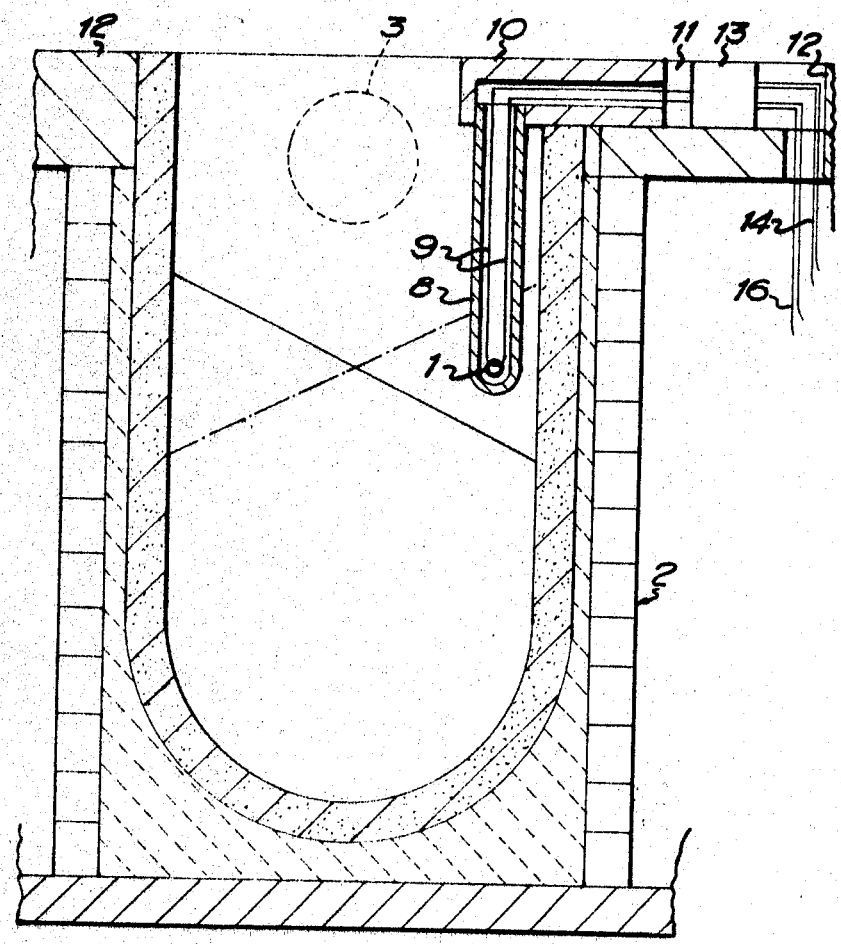

The invention will now be described with reference to the accompanying drawings, showing by way of example only vacuum melting and casting equipment equipped for carrying out the method, and in which FIGURE 1 is a diagrammatic section with the furnace in melting position;

FIGURE 2 corresponds to FIGURE 1 but shows the furnace tilted back for taking the temperature of the molten metal; and FIGURE 3 is a detail of part of FIGURES 1 and 2 to a larger scale.

In the figures, a thermocouple 1 is mounted at one side of an induction melting furnace 2, which is mounted on an axis 3 so that the furnace can be disposed in an attitude during melting (FIGURE 1) in which the metal 4 will not contact the thermocouple. When it is desired to take the temperature of the molten metal, the furnace is tilted back (FIGURE 2) to bring the molten metal into contact with the thermocouple. The furnace may be maintained in the latter position until the casting or pouring temperature is reached, at which stage the furnace is swung to a greater extent about the axis until it discharges into a mould 5, which is enclosed by a vacuum container 6 sealed to a structure 7 enclosing the furnace 2.

The thermocouple 1 is protected by a refractory sheath 8, within which leads 9 are electrically insulated (not shown), the sheath supporting the thermocouple from a sleeve 10 located in a groove 11 in a top plate 12 of the furnace 2 and made of graphite, stainless steel or other refractory material. The groove 11 also houses a connector 13 (FIGURE 3 only) for a cable 14 connecting the leads 9 to a temperature indicator 15, a compensating cable 16 also extending between the connector and the indicator.

What I claim is:

1. A vacuum melting and casting installation, comprising:
    a melting furnace,
    a thermocouple mounted at one side inside the furnace,
    a refractory sheath for the thermocouple,
    a structure supporting the furnace,
    said structure including a mounting axis for the furnace for tilting the furnace between a position in which molten metal will not contact the thermocouple sheath and a position in which molten metal will contact the thermocouple sheath and also to a position for pouring metal from the furnace,
    a mould supported with respect to the furnace to receive metal from the furnace in a pouring position,
    a vacuum enclosure for the furnace and the mould,
    a temperature indicator outside the vacuum enclosure, and
    a cable connecting the thermocouple to the temperature indicator.

2. A vacuum melting and casting installation, comprising:
    an induction melting furnace,
    a thermocouple mounted at one side inside the furnace,
    a refractory sheath for the thermocouple,
    a structure supporting and enclosing the furnace,
    said structure including a mounting axis for the furnace for tilting the furnace between a position in which molten metal will not contact the thermocouple sheath and a position in which molten metal will contact the thermocouple sheath and also to an inverted position for pouring metal from the furnace,
    a mould including a feeder head supported in contact with the rim of the furnace,
    a vacuum container for the mould sealed to the furnace structure, a temperature indicator outside the vacuum container and furnace structure, and a cable connecting the thermocouple to the temperature indicator.

3. A vacuum melting and casting installation according to claim 2 further comprising a refractory sleeve for supporting said thermocouple sheath, a connector for the cable from said thermocouple to said temperature indicator, a compensating cable extending between said connector and said indicator, and a groove in the rim of said furnace for retaining said refractory sheath and said connector.

References Cited

UNITED STATES PATENTS

| | | | |
|---|---|---|---|
| 1,325,539 | 12/1919 | Snyder | 13—1 |
| 2,523,691 | 9/1950 | Fitch | 73—354 |
| 3,357,250 | 12/1967 | Lowdermilk | 164—4 X |

BERNARD A. GILHEANY, Primary Examiner

H. B. GILSON, Assistant Examiner

U.S. Cl. X.R.

219—210